US011807749B2

(12) United States Patent
Li et al.

(10) Patent No.: US 11,807,749 B2
(45) Date of Patent: Nov. 7, 2023

(54) ELECTRICALLY CONDUCTIVE PVC SOLVENT CEMENT

(71) Applicants: Qing Li, Oakville (CA); Louis Daigneault, Mississauga (CA); Filippo Martino, Oakville (CA)

(72) Inventors: Qing Li, Oakville (CA); Louis Daigneault, Mississauga (CA); Filippo Martino, Oakville (CA)

(*) Notice: Subject to any disclaimer, the term of this patent is extended or adjusted under 35 U.S.C. 154(b) by 182 days.

(21) Appl. No.: 17/495,354

(22) Filed: Oct. 6, 2021

(65) Prior Publication Data
US 2023/0103333 A1    Apr. 6, 2023

(51) Int. Cl.
*C08L 27/06*    (2006.01)
*C08K 3/04*    (2006.01)

(52) U.S. Cl.
CPC .............. *C08L 27/06* (2013.01); *C08K 3/041* (2017.05); *C08K 3/042* (2017.05); *C08K 2201/001* (2013.01); *C08L 2203/18* (2013.01)

(58) Field of Classification Search
CPC .. C08L 27/06; C08L 2205/16; C08L 2203/20; C08L 2203/18; C08K 2201/001; C08K 3/041; C08K 3/042; C09J 9/02; C09J 127/24
See application file for complete search history.

(56) References Cited

U.S. PATENT DOCUMENTS 3,298,896 A    1/1967    Szegvari

FOREIGN PATENT DOCUMENTS

| CN | 1087926 | * | 6/1994 |
| CN | 112 159 634 | | 9/2020 |
| EP | 0643116 | * | 3/1995 |
| GB | 832047 | | 4/1960 |
| WO | WO 2000/50494 | | 8/2000 |
| WO | WO 2020/170154 | | 8/2020 |

OTHER PUBLICATIONS

Salavagione, Journal of Materials Chemistry, 2012, 22, p. 7020-7027 (Year: 2012).*
Translation of CN1087926 (Year: 1994).*
Extended European Search Report and Written Opinion for European Application No. 22 198 041.0 dated Feb. 15, 2023.

* cited by examiner

*Primary Examiner* — Robert C Boyle

(57) ABSTRACT

In a preferred embodiment, there is provided an electrically conductive solvent cement for coupling thermoplastic components, the cement comprising a thermoplastic resin, a solvent for dissolving the thermoplastic resin, and an electrically conductive material.

15 Claims, 3 Drawing Sheets

ELECTRICALLY CONDUCTIVE PVC SOLVENT CEMENT

FIELD OF THE INVENTION

This invention relates to a solvent cement for coupling thermoplastic components, and which preferably includes a thermoplastic resin, a solvent for dissolving the thermoplastic resin, and an electrically conductive material for imparting electrical conductivity thereto.

BACKGROUND OF THE INVENTION

Thermoplastic materials, such as polyvinyl chloride (PVC), have been used for municipal, plumbing, industrial and electrical systems, including pipes and fittings. Connection between PVC components, such as PVC pipes and fittings, have been made with a solvent cement also containing PVC and a solvent. Solvent cement is used by application to surfaces of the PVC components to be joined, and permitting the cement to dry and the solvent to evaporate. Solvent cement operates by first softening or solvating the surfaces of the PVC components, thereby permitting the polymer chains of the PVC components and the solvent cement to come into contact and form a welded joint.

SUMMARY OF THE INVENTION

A possible non-limiting object of the present invention is to provide an electrically conductive solvent cement for coupling electrically conductive thermoplastic components, and which may permit electrical connection, communication or current between the components.

Another possible non-limiting object of the present invention is to provide an electrically conductive solvent cement for coupling electrically conductive thermoplastic components, and which may permit reduced volume resistance or resistivity and improved viscosity to provide secure bond between the components.

In one aspect, the present invention provides an electrically conductive solvent cement for coupling thermoplastic components, the cement comprising a thermoplastic resin, a solvent for dissolving the thermoplastic resin, and an electrically conductive material.

In yet another aspect, the present invention provides use of an electrically conductive solvent cement for coupling thermoplastic components, the cement comprising a solvent, a thermoplastic resin and an electrically conductive material.

In yet another aspect, the present invention provides a method for preparing an electrically conductive solvent cement, the method comprising adding a thermoplastic resin to a solvent to obtain a solvent cement, and mechanically mixing an electrically conductive material in the solvent cement, whereby the electrically conductive material is dispersed in the solvent cement.

It is to be appreciated that the thermoplastic resin is not strictly limited, provided the thermoplastic resin permits operation of the solvent cement for bonding thermoplastic components or articles. In one embodiment, each said thermoplastic component and the thermoplastic resin independently of each other comprises one or more thermoplastic polymers selected from the group consisting of polyacrylic acid, poly(methyl methacrylate) (PMMA), acrylonitrile butadiene styrene (ABS), polyamide, polylactic acid, polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polystyrene, polyvinyl chloride (PVC), chlorinated PVC (CPVC), polyvinylidene fluoride (PVDF) and polytetrafluoroethylene (PTFE).

In one embodiment, the thermoplastic polymer of the thermoplastic component is identical to the thermoplastic polymer of the thermoplastic resin. In an alternative embodiment, the thermoplastic polymer of the thermoplastic component is different from the thermoplastic polymer of the thermoplastic resin. In one embodiment, the thermoplastic polymer is ABS, PC, PVC, chlorinated PVC, polystyrene or PVDF. In one embodiment, the thermoplastic polymer is PVC or CPVC, or ABS.

It is to be appreciated that the solvent is not strictly limited, provided the solvent permits mixing with or dissolving the thermoplastic resin to preferably form a solution, softening surfaces of the thermoplastic components or articles, and evaporation after application to the thermoplastic components or articles to obtain a bond therebetween. In one embodiment, the solvent comprises a volatile organic solvent. In one embodiment, the solvent comprises one or more of tetrahydrofuran (THF), N-methyl-2-pyrrolidone (NMP), dimethyl sulfoxide (DMSO), dimethyl formamide (DMF), methyl ethyl ketone (MEK), methyl isoamyl ketone (MIAK), methyl isobutyl ketone (MIBK), cyclohexanone and acetone. In one embodiment, the solvent comprises THF. In one embodiment, the solvent comprises THF in combination with one or more of MEK and cyclohexanone. In one embodiment, the solvent comprises THF, MEK and cyclohexanone.

It is to be appreciated that the electrically conductive material is not strictly limited, provided the material permits the solvent cement to be electrically conductive. In one embodiment, the electrically conductive material comprises an electrically conductive metal or non-metal material. In one embodiment, the electrically conductive metal material is a metal powder or fiber comprising one or more of copper, silver, aluminum and stainless steel. In one embodiment, the electrically conductive non-metal material is a carbon-based electrically conductive material. In one embodiment, the electrically conductive non-metal material comprises one or more of carbon black, high structure carbon black, carbon fiber, milled carbon fiber, chopped carbon fiber, graphite, graphene, graphene fiber and carbon nanotube. In one embodiment, one or both of the electrically conductive metal and non-metal materials are dispersed or finely dispersed in the solvent cement. In one embodiment, the electrically conductive non-metal material is dispersed or finely dispersed in the solvent cement.

In one embodiment, the high structure carbon fiber has an oil absorption number larger than 150 mL/100 g. In one embodiment, the milled carbon fiber has a carbon content of about 95 weight % or greater, an average fiber length of about 100 μm or greater and/or a fiber diameter of about 1 μm to about 15 μm. In one embodiment, the carbon content is 97, 98 or 99 weight % or greater. In one embodiment, the average fiber length is about 100 μm to about 1,000 μm, about 200 μm to about 600 μm or about 300 μm to about 500 μm. In one embodiment, the fiber diameter is about 3 μm to about 12 μm, about 5 μm to about 10 μm or about 7.2 μm. In one embodiment, the milled carbon fiber has a round filament shape.

In one embodiment, the solvent cement comprises 5 to 30 weight % of the thermoplastic resin, 50 to 95 weight % of the solvent, and 2 to 10 weight % of the electrically conductive material, relative to a total weight of the solvent cement. In one embodiment, the solvent cement comprises 5 to 30 weight % of the thermoplastic resin, 60 to 93 weight % of the solvent, and 2 to 10 weight % of the electrically conductive material, relative to a total weight of the solvent cement.

In one embodiment, the solvent comprises about 25 to about 50 weight % THF, about 5 to about 36 weight % MEK and about 15 to about 30 weight % cyclohexanone, relative to a total weight of the solvent.

In one embodiment, the electrically conductive material comprises milled carbon fiber, and/or the solvent cement has a viscosity of about 500 cP or more. In one embodiment, the viscosity is about 500 mPa·s or more. In one embodiment, the viscosity is between about 500 cP and about 3000 cP, between about 700 cP and about 2000 cP, or between about 900 cP and about 1500 cP. In one embodiment, the solvent cement has a volatile organic compound (VOC) content of less than 510 g/L.

It is to be appreciated that the thermoplastic components are not strictly limited, provided the components are compatible with the solvent cement joining, welding or bonding the components. In one embodiment, the thermoplastic components are intended for use with a municipal, plumbing, industrial and electrical system, the components comprising one or more of a pipe and a fitting. In one embodiment, the fitting comprises one or more of a wye, tee, elbow and coupling. In one embodiment, the thermoplastic components comprise one or more of a sheet and a profile. In one embodiment, the thermoplastic components are electrically conductive thermoplastic components. In one embodiment, the thermoplastic resin comprises PVC or chlorinated PVC, and the thermoplastic components are electrically conductive thermoplastic components comprising a PVC or chlorinated PVC pipe or fitting. In one embodiment, the solvent cement is selected to electrically couple the thermoplastic components or increase electrical conductivity between the electrically conductive thermoplastic components. In one embodiment, the solvent cement is a medium-bodied and fast setting cement.

It is to be appreciated that the thermoplastic components are not strictly limited, provided the components are compatible with the solvent cement joining, welding or bonding the components.

In one embodiment, said mixing the electrically conductive material in the solvent cement comprises mechanically mixing the electrically conductive material in the solvent cement using an overhead stirrer. In one embodiment, said mechanically mixing is selected to provide a mechanical energy with approximate 5000 kJ to mix the electrically conductive material with the solvent cement based on total mass of 500 g for one (1) minute. In one embodiment, subsequent to said mixing the electrically conductive material in the solvent cement, the electrically conductive material is finely dispersed in the solvent cement. In one embodiment, the mechanical energy is between about 1000 and about 10000 kJ, preferably between about 3000 and about 8000 kJ, or more preferably between about 4000 and about 7000 kJ, for a total mass of 500 g for one (1) minute.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

An electrically conductive PVC solvent cement was prepared by dissolving PVC resin to a solvent mixture having 38 weight % THF, 21 weight % MEK and 23 weight % cyclohexanone relative to the total weight of the solvent mixture, so as to obtain a PVC solvent cement. Milled carbon fiber was mechanically mixed in the PVC solvent cement using an overhead stirrer to obtain the electrically conductive PVC solvent cement, so that the electrically conductive PVC solvent cement contained 12 weight % of the PVC resin, 80 weight % of the solvent mixture, and 8 weight % of the milled carbon fiber relative to the total weight of the electrically conductive PVC solvent cement. The milled carbon fiber was finely dispersed in the PVC solvent cement with minimal damage to the milled carbon fiber. The total required mechanical energy to mix milled carbon fiber in the PVC solvent cement was approximately 5000 kJ per 500 g total mass based on one (1) minute mixing.

Figure 1:
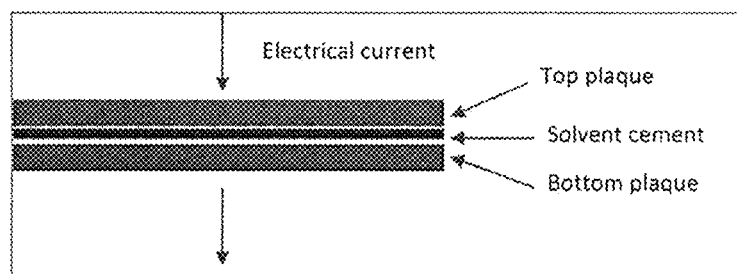
FIG. 1 shows a welded PVC plaque prepared with an electrically conductive PVC solvent cement in accordance with a preferred embodiment of the present invention.

As seen in FIG. 1, a welded PVC plaque was prepared with the electrically conductive PVC solvent cement by applying the cement to a surface of a first PVC plaque and applying a surface of a second PVC plaque to the applied cement. The cement was allowed to cure for about 10 to about 30 minutes depending on the temperature, until fully cured.

Figure 2:
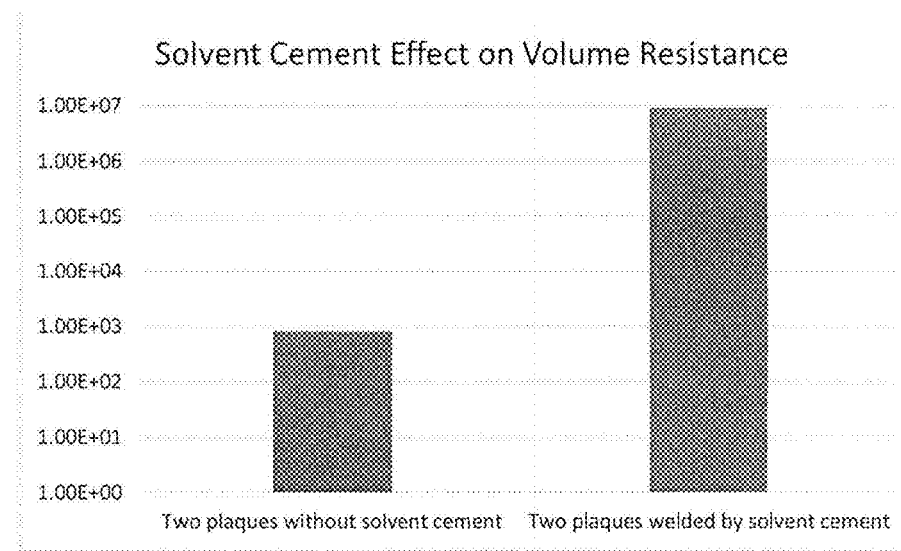
FIG. 2 shows a bar graph illustrating volume resistance of the welded PVC plaque shown in FIG. 1 and that of a welded PVC plaque prepared with an electrically non-conductive PVC solvent cement.

The welded PVC plaque was shown to conduct an electrical current between the first and second PVC plaques. As seen in FIG. 2, volume resistance was measured to be lower than a further welded PVC plaque prepared with a known electrically non-conductive PVC solvent cement.

Figure 3:
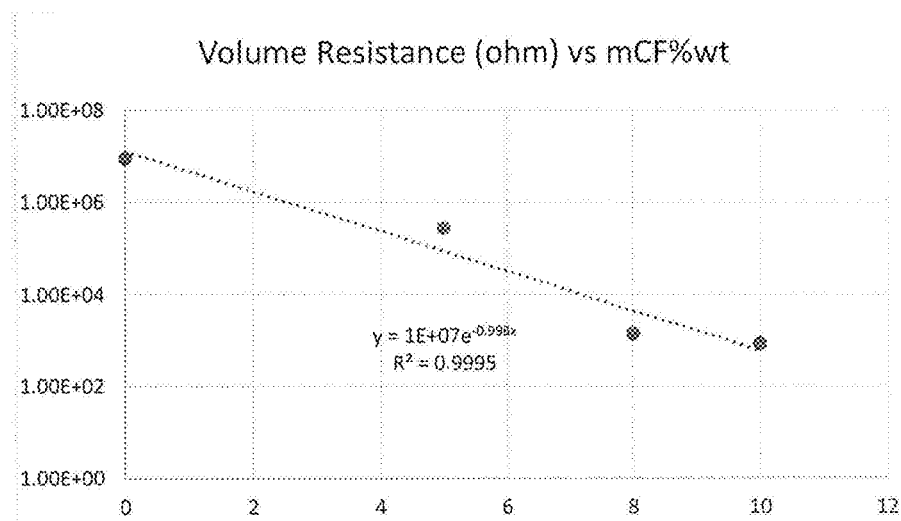
FIG. 3 shows a line graph illustrating on the y-axis volume resistance of the electrically conductive PVC solvent cement with varying weight percent of milled carbon fiber (x-axis) included in the solvent cement.

The effect of the weight ratio of the milled carbon fiber in the electrically conductive PVC solvent cement was tested. As seen in FIG. 3, the volume resistance of the electrically conductive PVC solvent cement decreased with the increasing weight ratio of the milled carbon fiber included therein. On the other hand, the applicant has recognized that viscosity of the solvent cement will increase with the increasing weight ratio of the milled carbon fiber included therein, negatively affecting use of the solvent cement in welding the first and second PVC plaques due to the filler's nature of electrically conductive material.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. An electrically conductive solvent cement for coupling thermoplastic components, the cement comprising a thermoplastic resin, a solvent for dissolving the thermoplastic resin, and an electrically conductive material, wherein the electrically conductive material comprises milled carbon fiber, and the solvent cement has a viscosity of about 500 cP or more.

2. The solvent cement of claim 1, wherein the thermoplastic components and the thermoplastic resin independently of each other comprise a thermoplastic polymer selected from the group consisting of polyacrylic acid, poly(methyl methacrylate) (PMMA), acrylonitrile butadiene styrene (ABS), polyamide, polylactic acid, polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polystyrene, polyvinyl chloride (PVC), chlorinated PVC (CPVC), polyvinylidene fluoride (PVDF) and polytetrafluoroethylene (PTFE).

3. The solvent cement of claim 1, wherein the solvent comprises one or more of tetrahydrofuran (THF), N-methyl-2-pyrrolidone (NMP), dimethyl sulfoxide (DMSO), dimethyl formamide (DMF), methyl ethyl ketone (MEK), methyl isoamyl ketone (MIAK), cyclohexanone and acetone.

4. The solvent cement of claim 1, wherein the electrically conductive material further comprises one or more of carbon black, graphite, graphene and carbon nanotube dispersed in the solvent cement.

5. The solvent cement of claim 1, wherein the solvent cement comprises 5 to 30 weight % of the thermoplastic resin, 50 to 95 weight % of the solvent, and 2 to 10 weight % of the electrically conductive material, relative to a total weight of the solvent cement.

6. The solvent cement of claim 1, wherein the solvent comprises 25 to 50 weight % THF, 5 to 36 weight % MEK and 15 to 30 weight % cyclohexanone, relative to a total weight of the solvent.

7. The solvent cement of claim 1, wherein the thermoplastic resin comprises PVC or chlorinated PVC, and the thermoplastic components are electrically conductive thermoplastic components comprising a PVC or chlorinated PVC pipe or fitting.

8. A process for coupling first and second thermoplastic components, the method comprising providing an electrically conductive solvent cement comprising a solvent, a thermoplastic resin and an electrically conductive material, wherein the electrically conductive material comprises milled carbon fiber, and the solvent cement has a viscosity of about 500 cP or more; applying the cement between the first and second thermoplastic components; and drying the cement or permitting the cement to dry.

9. The process of claim 8, wherein the first and second thermoplastic components and the thermoplastic resin independently of each other comprise a thermoplastic polymer selected from the group consisting of polyacrylic acid, poly(methyl methacrylate) (PMMA), acrylonitrile butadiene styrene (ABS), polyamide, polylactic acid, polybenzimidazole (PBI), polycarbonate (PC), polyether sulfone (PES), polyoxymethylene (POM), polyether ether ketone (PEEK), polyetherimide (PEI), polyphenylene oxide (PPO), polyphenylene sulfide (PPS), polystyrene, polyvinyl chloride (PVC), chlorinated PVC (CPVC), polyvinylidene fluoride (PVDF) and polytetrafluoroethylene (PTFE).

10. The process of claim 8, wherein the solvent comprises one or more of tetrahydrofuran (THF), N-methyl-2-pyrrolidone (NMP), dimethyl sulfoxide (DMSO), dimethyl formamide (DMF), methyl ethyl ketone (MEK), methyl isoamyl ketone (MIAK), cyclohexanone and acetone.

11. The process of claim 8, wherein the electrically conductive material further comprises one or more of carbon black, graphite, graphene and carbon nanotube dispersed in the solvent cement.

12. The process of claim 8, wherein the solvent cement comprises 5 to 30 weight % of the thermoplastic resin, 50 to 95 weight % of the solvent, and 2 to 10 weight % of the electrically conductive material, relative to a total weight of the solvent cement.

13. The process of claim 8, wherein the solvent comprises 25 to 50 weight % THF, 5 to 36 weight % MEK and 15 to 30 weight % cyclohexanone, relative to a total weight of the solvent.

14. The process of claim 8, wherein the thermoplastic resin comprises PVC or chlorinated PVC, and the thermoplastic components are electrically conductive thermoplastic components comprising a PVC or chlorinated PVC pipe or fitting.

15. The process of claim 14, wherein said process is for electrically coupling the electrically conductive thermoplastic components.

\* \* \* \* \*